3,552,127
COMPOSITE HIGH ENERGY ROCKET PROPELLANTS AND PROCESS FOR SAME
Jacque C. Morrell, 8 Oxford St.,
Chevy Chase, Md. 20015
No Drawing. Continuation-in-part of application Ser. No. 100,755, Apr. 4, 1961. This application Aug. 25, 1964, Ser. No. 392,000
Int. Cl. C06d 5/00, 5/10
U.S. Cl. 60—215                 23 Claims This application is a continuation-in-part of my copending application Ser. No. 100,755 filed Apr. 4, 1961, now Pat. No. 3,153,902.

This invention relates to high energy rocket propellants and the process by which they are employed in the rocket engine for rocket powered flight.

In general rocket propellants consist of a number of fuels and oxidizers having suitable properties, and which have been used by combining them with each other usually in pairs. One class of propellants in which the fuel and oxidizer are combined in a single composition are known as monopropellants and these may be divided into single and double base compositions. The more generally and widely used class however employ two separate materials, i.e., an oxidizer and a fuel and these are referred to in use as bipropellant rocket systems. The latter are divided into two large classes designating generally their physical properties namely liquid propellants, and solid propellants. The liquid propellants that is the fuel and the oxidizer are stored in containers separately in the rocket system, whereas in the solid propellants the fuel and oxidizers are combined as solids in a single mixture of the two components in suitable shapes or forms for use in the rocket. Various combinations of the two systems while heretofore considered as a possibility have not generally been regarded as practical. The present invention relates particularly to liquid propellants and liquid bipropellant rocket systems in which both the fuel and the oxidizer are employed in liquid form in the rocket engine system as a self-contained source of rocket power to propel the rocket in flight.

The liquid fuel which I employ is actually a unique composite but stable mixture which is made up by suspending finely divided high energy hydrides which possesses high energy and other unique characteristics and related high energy compounds generally in a selected liquid fuel preferably and generally of the class of liquid hydrocarbons, and preferably selected on a basis of density and other characteristics so that the resulting dispersion or suspension of finely divided compounds in the hydrid class (and other high energy solid compounds) in the liquid hydrocarbon suspending or dispersing medium is stable both physically and chemically and possesses superior rocket fuel properties. More specifically these compounds comprise beryllium hydride ($BeH_2$); decaborane ($B_{10}H_{14}$); magnesium borohydride ($Mg(BH_4)_2$); lithium amide $Li(NH)_2$; and aluminum hydride (preferably aluminum hydride-⅓ etherate, $AlH_3 \cdot ⅓$ EtO). All of these may be referred to for present purposes as high energy solid rocket fuel additives; and in finely divided form are dispersed or suspended in various hydrocarbon media comprise my composite high energy rocket fuel propellants. The oxidizers (which are necessary in rocket systems) employed with my fuel are also liquid and may cover a wide range of substances such as liquid oxygen, fuming nitric acid, hydrogen peroxide, liquid ozone, liquid fluorine and others heretofore used successfully in the art but which when combined with my fuel gives results which are much superior to those otherwise obtained on a comparable basis. The bipropellant rocket systems used by me in connection with my invention are generally those which employ features which have been fully proven with conventional fuels, or practical variations thereof, but which are likewise on a selected basis. The overall improvement and results obtained in my invention comprise a novel bipropellant rocket system process, as well as highly superior rocket fuel giving greatly improved results when used in connection therewith; all of which will be more fully described and set forth hereinafter.

The rocket in general is a vehicle propelled by a combustion motor or rocket engine, which is self contained with respect to the fuel and oxidizer required for combustion and is thus independent of external means such as the atmosphere for supporting combustion. Rockets depend for their propulsion upon the ejection of hot gases produced by the combustion of the materials carried in the system, i.e., the separate propellants consisting of the fuel and oxidizer. The rocket thus produces thrust by the reaction produced by the hot gases resulting from the combustion of the propellants. The latter are fed under pressure to a combustion chamber and are burned therein. The hot gaseous products of combustion escape with high velocity through the nozzle or throat of the chamber and thereby produces a powerful force equal and opposite to that of the jet which propels the rocket engine, and the frame, and in general the rocket thus overcoming starting inertia and resistance of the air to sustain flight. The force or thrust produced is generally constant which causes the rocket to be accelerated at a progressively higher rate, since the total weight of the vehicle is diminished as the propellants are consumed. The force may be expressed in various units such as pounds of force or rate of doing work such as horsepower, which is a measure of thrust and velocity, but the conventional measure for rockets is generally specific impulse, i.e., the number of pounds of thrust produced per pound of propellant consumed per second. However there are other features of efficiency of bipropellants which will also be referred to below.

It is important to note that there are great differences between rocket engines and other types of internal combustion engines the principal one being that the former carry their own source of oxygen or other oxidizer (as well as fuel), and therefore are independent of the atmosphere, and of altitude constituting in this respect an ideal power plant for use beyond the earth's atmosphere.

In its simplest form the rocket comprises the rocket engine, which generally refers to the combustion chamber and nozzle but which for present purposes may comprise as a rocket engine system the source of fuel and oxidizer, i.e., the propellant tanks and the supply of the same together with feed means and accessories. The source and supply of fuel and oxidizer vitalize the process of power production in the combustion chamber and may therefore be considered an essential part of the rocket engine system. The air frame which generally includes all dead weight refers principally to the supporting structure, tubular housing and the like. The simple rocket is generally balanced for flight, but without guidance means. Control of the flight path of a rocket propelled vehicle may be obtained by various methods including swiveling the engine itself. If the system includes guidance means so that its trajectory or flight path may be altered by a mechanism within the rocket it is generally referred to as a guided missile. The latter generally contains electronic and optical devices, radar, television, etc., for observation. Both may contain a war head. Generally anything beyond the bare essentials of flight is referred to as payload.

I may apply my invention to all of the above variations and may employ all of the known devices and refinements in connection therewith including multistage systems (including multi-engines) to obtain higher velocities and range. However in its essence my invention relates more specifically to the improved fuel described herein and to its application to improving the efficiency of the process of rocket engine systems; and more particularly of liquid bi-propellant rocket engine systems.

The elements of the rocket engine system required to carry out the process of my invention as well as the latter will be described in greater detail in connection with the drawings and the illustrative figures; however in general they comprise a source and supply of my composite high energy compound hydrocarbon fuel, and a separate supply of liquid oxidizer of the type referred to. The fuel and oxidizer are generally stored in tanks in the system, and gas pressure or pumps (and means for actuating the latter) to force the fuel and oxidizer on a controlled basis through jets into the combustion chamber wherein the mixture is ignited by ignition means to produce hot gases of combustion which are passed at high velocity through the nozzle or throat of the combustion chamber producing a high velocity jet stream which produces a thrust or force by reaction for propulsion of the vehicle. As pointed out previously the source and supply of the fuel and oxidizer vitalize the process of power production in the combustion chamber (and its utilization by the rocket for flight), and my special fuel particularly has an integral part in the improvements obtained in the process.

Having described my special fuel and the rocket engine and power plant system operation in which it may be employed in a general way, I shall proceed to a detailed description and discussion of the liquid fuel components of the propellant and the manner in which they are selected to prepare the composite fuel. The latter as pointed out is a composite consisting of a stable suspension of beryllium hydride and other but nonequivalent substances such as magnesium borohydride and a normally solid boron hydride known as decaborane; a stable form of aluminum hydride; and lithium amide, in a liquid hydrocarbon mixture or chemically stable derivative thereof. In this connection I may refer also to my copending application, Ser. No. 100,755 cited above, which relates to various lithium compound hydrides suspended in finely divided form in special hydrocarbons to produce high energy composite fuels.

In my present invention I prefer the heavier, or higher boiling paraffin and other relatively normally inert hydrocarbons including the liquid series (generally in admixture) because of their complete nonreactivity with the hydrides. In this connection I may also employ the heavier cycloparaffin and aromatic hydrocarbons. The last named may be obtained from the heavier coal tar distillates. Olefins are least desirable (as under some conditions they may react with the hydrides) but they may be present in minor amounts. Certain hydrogenated hydrocarbons such as the hydronaphthalenes, e.g., tetra and deca hydronaphthalenes (commercially known as tetralin and decalin) and amyl naphthalene may also be employed, especially in admixture with those named above. The properties of these compounds: decalin, deca hydronaphthalene ($C_{10}H_{18}$) sp. gr. 0.895; tetralin, tetra-hydronaphthalene ($C_{10}H_{12}$) sp. gr. 0.971 and amyl naphthalene ($C_{15}H_{18}$) 0.965, as well as heavy solvent naphtha and the higher boiling neutral coal tar distillates make them particularly attractive for blends in connection with suspensions of the hydrides and other additives which I employ on a selective basis. With regard to the source of hydrocarbons I may point out that in addition to those from petroleum and coal tars I may utilize selected distillates from wood tars, shale oils and other natural sources of hydrocarbons as well as synthetic hydrocarbons.

The paraffin hydrocarbons may vary over the whole range of liquid hydrocarbons and may be present in major amounts in the commercial products gasoline, naphthas, kerosene, the various jet fuels (JP 1 to JP 6 inclusive). These lighter hydrocarbons are employed largely in my copending application No. 100,755; but in my present invention I prefer the heavier fractions such as diesel and heavy burner fuels and other higher boiling distillates which may be used either as such or in various blends with the others named to meet the density and other requirements of my composite hydride (and other high energy compounds) fuel as hereinafter described. The cycloparaffins occur mainly in the naphthene base oils or as narrow fractions of individual compounds, and are likewise suitable on a selected basis. The aromatic hydrocarbons used in many cases are derived from coal tar distillates, especially the heavier fractions which may be adapted because of density and specific gravity particularly in admixture such as heavier solvent naphtha which is a commercial fraction and the middle oils as well as the higher boiling and heavier distillates. Some petroleum fractions also contain aromatic hydrocarbons and the heavier aromatic coal tar distillates may have paraffinic (alkyl) side chains. Various mixtures of these hydrocarbons also may be employed. It is to be noted also that in the prevailing commercial natural petroleum products noted above from the various crude sources that the paraffins usually predominate, the naphthenes and aromatics are present to an extent dependent on source and processing, while the olefins (which are least desirable but can be used in lesser amounts) are present only in cracked products: The other hydrocarbons are present of course in the cracked distillates, the heavier fractions of which may be used, preferably by blending with heavier straight run petroleum or coal tar distillate products in special cases where they may be employed. In general all of the commercial products referred to above including especially the heavier hydrocarbon distillates may be employed for my special fuels. These are generally manufactured and sold in the open market or blends thereof with each other and with the other products named above or they may be simply blended so that the density or specific gravity of the hydrocarbons are the equivalent or approximately of the same order as the hydrides and other high energy compounds employed by me. Obviously synthetic hydrocarbons (which includes hydrogenated hydrocarbons), as well as hydrocarbons from sources other than those named of suitable characteristics may also be employed by me. Normally the blends can be made on the basis of the products named above to be of substantially equivalent specific gravity to the additive hydride and other high energy compounds named above with some variation in specific gravity, e.g., about $0.1\pm$ (although closer equivalencies are desired) are allowable. Wider variations may also be used in some cases.

The approximate specific gravities of the high energy solid additive compounds are: beryllium hydride about 0.9; decaborane about 0.95; magnesium borohydride about 1.1; lithium amide about 1.2; and aluminum hydride-$\frac{1}{3}$ EtO (etherate) about 1.1. The last named is the preferred form of stable aluminum hydride and is generally believed to be a polymerized form of the compound. A stable form is used.

The heavier petroleum product, e.g., the heavy diesel fuels and heavy burner distillates and heavier distillates generally such as gas oil and the fuel oil distillates may be used in my products and processes alone and especially in admixture with each other and with the other hydrocarbon products disclosed herein. The heat content of the heavier paraffin hydrocarbon type of fuel oils from petroleum, e.g., about 18,000 B.t.u. per pound (varying with gravity and type). This is somewhat higher than the aromatic hydrocarbons from coal tar with less hydrogen. The various hydrocarbon products useful in connection with my present invention are also characterized by boiling rante of the components and of course by specific gravity or density. In some cases solubility effects and reactivity are also considered. All of these products may be used particularly if blended to arrive at suitable densities or specific gravities. The latter property is of course of great importance in the selection of hydrocarbon liquids which may be used to make a stable suspension of the hydrides and other high energy compounds mentioned and used in connection with my invention. They are selected on a basis so that the suspended compounds will not settle out (or in which settling is greatly retarded) and which contributes the necessary rocket fuel characteristics which in combination give improved results.

The density (which is the weight per cubic centimeter), or the specific gravity (which is the relative weight of a definite volume compared with water at the same temperature) of the hydrocarbon mixtures varies with the fraction increasing generally with increasing boiling point for the same series of hydrocarbons. These mixtures contain a large number of individual hydrocarbons. However from the practical viewpoint the commercial heavier distillate fractions of petroleum and coal tar are preferred, because of availability or ease of production. Wood tar distillates are also useful. In addition it is a relatively simple matter to blend any selected fraction of heavy petroleum distillates and/or coal tar (or wood tar) distillates to obtain the desired specific gravity along with necessary fuel characteristics. Moreover the hydrocarbon products may be selected with regard to other physical and also chemical properties as will be referred to below.

Normally it is practical to make a suspension of the finely divided high energy compounds which would be stable (i.e., would not settle out as a practical matter) without any stabilizing additive. However if necessary or desirable the latter may be added as described below. Additions of small amounts of heavier or lighter distillates to the suspension may be made to correct for small differences in gravity; and small amounts of gasoline may be added to improve certain characteristics such as ignition. Also dispersants may be added to improve fluidity in some cases. The additives permit wider variations in specific gravity.

Diesel fuel oil distillates and heavier fuel distillates generally from petroleum may vary from about 0.85 to about 0.95 (and heavier) in specific gravity. These and other chemically stable hydrocarbons, e.g. the higher molecualr weight cycloparaffins (varying from cyclo-octane 0.85 sp. gr. and upward); and the hydrogenated napthalenes (decalin and tetralin sp. gr. 0.895 to 0.97) are particularly suitable for decaborane suspensions to minimize solubility. Also the distillates of napthalenic base oils with a similar range of specific gravities (0.9 to 0.98) are suitable for decaborene on the same basis. All of these hydrocarbons in the range of from about 0.85 to about 0.95 are also suitable for suspensions of beryllium hydried. Asphaltic base crude oil distillates in the same range and higher, e.g., sp. gr. 0.9 to 0.98 may also be used in the latter case. The intermediate coal tar distillates sp. gr. 0.86 to 0.9 which include crude toluene and solvent naptha; and the heavier solvent napthas sp. gr. 0.92 to 0.94 may also be used for beryllium hydride suspensions alone or in blends with any of the foregoing hydrocarbons. The temperatures at which these coal tar distillate fractions may be "cut" may range from about 160° C. to 200° C.

The fractions of coal tar distillates between about 200° C. and 270° C. normally contain the phenols, cresols, napthalene anthracene, etc. When these compounds are removed the resulting heavy oils referred to as "dead" oil or "neutral" oil, creosote oil, anthracene oil, etc., may have specific gravities from about 0.95 up to 1.0, i.e., equal to or greater (they are generally heavier) than water. Similarly wood tar oils from hardwood distillation may have specific gravities up to 1.0 and above. The distillates from gun resin and pine oils obtained from the distillation of resinous pine woods which include turpentine and the heavier pine distillates are also suitable for blending.

The heavier distillates from the distillation of petroleum oils (of various types) coal tar oils and wood oils alone or in admixture referred to above, i.e., those having specific gravities of about 0.95 to 1.1 are suitable as suspension media for the heavier additive high energy solids referred to above namely magnesium borohydride, lithium amide and aluminum hydride-⅓ etherate with specific gravities ranging from about 1.1 for magnesium borohydride and aluminum hydride-⅓ EtO on the one hand and about 1.2 for lithium amide. In this last case it may be desirable in some cases to add a very small amount of stabilizing agent referred to below to produce improved rocket fuels.

The physical basis for preparing the suspension of the high energy solid additives based on selection of the hydrocarbon primarily on specific gravity considerations and in special cases like decarborane partial solubility (and in the case of olefin hydrocarbons if the concentration is too high possible reactivity), and emphasizing the use of commercial products is discussed above; as well as from the various sources described above.

The high energy solids are extremely active and precautions must be taken in storing and handling them to avoid fire hazards. Also the material must be handled with caution by personnel and all protective devices employed for caustic and flammable materials must be employed. Grinding the material (or otherwise reducing) to fine powder (or finely divided condition) as required in the present invention must be done in a moisture free and preferably in an inert atmosphere such as dry nitrogen, argon, helium, etc. (carbon dioxide is reactive) and in an enclosed system. The same holds for filling containers. The bulk material which requiring care is easier to handle. The finely divided high energy solid compound, e.g., from about several thousandths of a millimeter in diameter or less down to about 1 micron more or less (the finer material being preferred), may be transferred to the hydrocarbon suspending agent or medium, e.g., burner or diesel fuels, gas oil or a heavy coal tar distillate, e.g., heavy solvent naphtha or neutral creosote oil of the appropriate density from about 0.85 to 1.0± and the operation is carried out preferably in an inert atmosphere by stirring or agitating the finely divided high energy solid material into the hydrocarbon liquid. The smaller and more uniform range of sizes of the high energy solid rocket fuel additive is preferred, but the upper ranges (or larger) will be stable also because of the density relationship. The hydrocarbon liquid is added in an amount to render the system fluid and so that the solid additive is in the internal phase; about 55 to 60% of liquid being required, although more liquid may be added on the one hand and up to 60% solids on the other hand in some cases. It is also emphasized that various blends of the hydrocarbons from various sources shown above may be employed and that the important and determining factor in my invention aside from the unique high energy fuel values of the components, to produce a stable suspension having desirable rocket fuel characteristics is the correlation of the densities of the external phase comprising the various hydrocarbon oil products with those of the internal phase consisting of the high energy solid rocket fuel compounds referred to above; and being non-reactive with each other.

Methods for the preparation of the high energy rocket fuel solid components which form the internal or suspended phase of my improved rocket fuels are available and their properties have been described. This information is important in connection with my invention as all of them have special high energy fuel characteristics and are very reactive and as indicated above require special precautions in handling. These data are summed up briefly below.

Beryllium Hydride ($BeH_2$): A non-volatile white solid; specific gravity about 0.9. It is insoluble in aromatic and paraffin hydrocarbons. It is stable at 80° C. but decomposes rapidly at 125° C. It reacts violently with water. It may be prepared by reacting dimethyl-beryllium (and in general by the reduction of beryllium compounds) with lithium aluminum hydride. Residual amounts of ether from the reaction medium may be present in the compound. The compound should be handled with great caution.

Dacaborane ($B_{10}H_{14}$): This white crystalline solid boron hydride is the only one of the series of boron and hydrogen compounds which is normally a solid. Its density or sp. gr. is 0.94 at 25° C. Its melting point is 100° C. and its boiling point is 213° C. It is only slightly soluble in cold water but decomposes in hot water. It has wide use especially in vulcanizing rubber including silicone rubber. It is especially noted that it is soluble in the lower boiling solvents such as alcohol ether and benzene but very much less so in low boiling paraffin hydrocarbons and especially in the higher boiling hydrocarbons employed in my invention; and especially those predominately of paraffinic type and cycloparaffinic or napthene types. Also I may employ hydrogenated napthalenes and similar compounds in some cases having specific gravities of about 0.9 to 0.965. It is noted in this connection that any dispersion which occurs in the form of a solution in addition to the suspended (or undissolved material) is effective as a rocket fuel, such as the heavy distillates ranging from diesel fuels (sp. gr. 0.87 to 0.91) and other heavier distillates; and heavier distillates generally in the specific gravity range of about 0.85 and upwards to above 0.95, e.g., boiler fuel sp. gr. 0.97; and blends of the same.

Magnesium Borohydride ($Mg(BH_4)_2$): White crystalline solid, slightly soluble in ether; specific gravity about 1.1. May be prepared through the reaction in ether solution between a magnesium dialkyl and deborane. The reaction proceeds at room temperature and the presence of the ether solvent appears to be necessary for good results. It is as expected very reactive and is a strong reducing agent.

Aluminum Hydride-⅓ Etherate ($AlH_3$-⅓ EtO): Specific gravity approximately 1.1. Aluminum hydride as such is hydralyzed rapidly by water or alcohol with the evolution of hydrogen and the formation of the oxide. It is known and is stable only in the polymeric form $(AlH_3)_x$; and it is in this form in which the present use is contemplated (and in general in the chemically stable form of aluminum hydride) whether as a polymer, or combined in part with ether. In this connection the latter is taken as a known example of this class of aluminum hydrides. When freshly prepared by the reduction of aluminum chloride, aluminum hydride is soluble in ethyl ether as a low polymeric compound and as the solution polymerization proceeds and a high polymeric form is precipitated as a white solid which is the material designated above. Presumably also it takes up about one-third of its weight of ethyl ether in this process hence the designation as shown. It is of course to be understood that the stable form of $(AlH_3)_x$ is herein considered without regard to the amount of ether content the specific gravity of approximately 1.1 however refers to

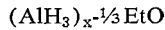

$(AlH_3)_x$-⅓ EtO and in this connection I contemplate using various stable members of the series.

Lithium Amide ($LiNH_2$): Specific gravity about 1.2. It is made by heating lithium hydride with nitrogen (lithium imide $Li_2NH_2$ and lithium nitride $Li_3N$ may also be formed depending on the conditions). In liquid or gaseous ammonia lithium hydride forms lithium amide. $Li_2NH_2$ and $Li_3N$ could also be used in connection with my invention with the heavier hydrocarbons described above with the use of stabilizing agents although it is preferred to minimize the use of the latter.

All of the compounds descirbed above are affected by, or react strongly with water. They are however sufficiently stable to be used as described in my invention with suitable precautions.

I may also in some cases employ additions of surface active materials or stabilizing or gelling agents to assist in stabilizing the suspensions, especially with the heavier compounds. These are generally of the type which if used in emulsion systems they would be soluble in the oil and the latter would be in the continuous phase. They may also be found in the class of hydrophobic esters, and are of a non-ionic type. Among this class are some of the fatty acid esters of the poly vinyl alcohols such as the glyceryl oleates, stearates and laurates. Also certain sterols and sterol esters, as well as penta aerythritol dioleate and related soluble esters referred to as pentamuls may be used. Certain sterol esters of the type of cholesterol and lanolin have also been found useful in this connection, as well as compounds of the lecithin type. In another generalized class of suspending agents, to assist in special cases, where they are found desirable, are the soaps (i.e., the salts of the higher fatty acids) of the divalent metallic elements, e.g., the oleates, stearates, palmitates, etc., of the alkaline earth metals, calcium, barium and magnesium including the octoate of the latter. Corresponding lithium soaps on the one hand and aluminum soaps, e.g., the octoate or stearate may also be used as examples.

These materials referred to above may be used when found necessary to the extent of a fraction of one percent up to several percent by weight, e.g., from 1% to 2%, and will not react in these dilutions with the high energy finely divided solids. Normally my suspensions of the latter do not require these additives, but they may assist even where used in very small amounts in special cases, e.g., where the specific gravity of the hydrocarbon oil fraction is substantially lower than the material to be suspended or when needed as an assistant in "wetting" the finely divided solid material with the oil if this should be necessary. I may also in special cases if desired employ relatively high concentrations of petroleum jelly or the soaps named in the oil to obtain stability by viscosity effects but this is considered only in unusual cases. In this connection I may even obtain suspensions of a semi-solid gel character to be used for certain purposes and under certain conditions by dissolving or dispersing such compounds as an aluminum soap of coconut fatty acids and aluminum napthenate in the external hydrocarbon oil phase.

A principal requirement is that the system must be fluid. Concentrations or in general amounts of the high energy finely divided solid up to 50% and above, e.g., as high as 60% may be added, which in the present type of system where the specific gravity of the two phases i.e. the external or continuous hydrocarbon liquid and the disbursed high energy material are approximately the same, both by weight and volume, the latter having particular reference to the wetted material.

In order to control the viscosity of the system containing high percentages of dispersed solids, i.e., to obtain a sufficient fluid system in special cases, I may if necessary add dispersing agents, which are absorbed on the surface of the dispersed finely divided high energy solids in the internal phase. Examples of these in addition to some of those named above are the sorbitan esters as monolaurate, mono-oleate, and tri-oleate as well as substituted oxazoline and compounds in general having the desired effect.

The amount of the finely divided high energy materials which may be added to the hydrocarbon liquid depend on the degree of such division and uniformity of size and these factors in turn determine void space which is likewise a factor. These sizes may be of the order of less than one micron, e.g., in the range of about 0.1 to 0.5 micron. Grinding or reduction in size of the high energy material generally may be effected in an inert atmosphere and preferably in an inert liquid for example in a paraffin hydrocarbon medium as in the hydrocarbon oil in which it is to be dispersed. The latter must obviously be free of suspended water.

In general some excess of liquid must be present to obtain fluidity of the system which is necessary. On this basis the percentage of solid finely divided high energy material which may be added on a weight basis in practice would be from about 40% to about 50% of the resulting suspension. There is of course no lower limit and I may in some special cases add from several percent up to ten percent although generally these low concentrations would not be employed. Intermediate amounts for example from about 20% to about 40% could serve the useful purpose of substantial improvements in specific impulse and efficiency of performance while substantially maintaining the fluidity of the hydrocarbon liquid. The excess of liquid required to change from a stiff sludge like system to a fluid system is a relatively minor amount. While no difficulty in initial wetting of the powdered or finely divided high energy material is usually encountered, this may be overcome in special cases by adding a small fraction of one percent of the surface active materials referred to above.

Exact maximum amounts of the finely divided high energy material in various stages of subdivision which may be added to any particular hydrocarbon fraction or blend to produce any desired degree of fluidity and/or stability may in any event be readily determined by trial; and adjustments easily applied. The general principles described above which apply to the preparation of the finely divided solids may be applied quantitatively to the amounts required of any of them. The total weight of material suspended will of course be greater for those of high specific gravity but so will the total weight of the hydrocarbons per unit volume in the case of the latter.

The actual process of making up the suspensions of the high energy materials mentioned herein is simply to stir the finely divided powdered material into the liquid hydrocarbons (or make a paste therewith and dilute with the hydrocarbons) and agitate or stir until dispersion is complete. The operation is carried out preferably in an inert atmosphere as mentioned previously.

According to my invention I may utilize all of the finely divided high energy solid fuels, i.e., the various hydrides mentioned, including beryllium hydride, decaborane (boron hydride), magnesium boron hydride, aluminum hydride and the others mentioned above, particularly lithium amide (none of which are in any sense equivalent to the others from the viewpoint of specific physical and chemical properties, or cost and availability, etc.). In all cases they are suspended in finely divided form in a selected fraction of hydrocarbon liquids to produce a stable non-settling composite high energy liquid fuel; and as described they are used in combination with various liquid oxidizing compounds or agents of the class of liquid oxygen, liquid ozone (or mixtures), white and red fuming nitric acid, hydrogen peroxide (generally of high concentrations), liquid fluorine and various derivates e.g. chlorine mono and trifluoride, nitrogen oxides and fluorides and other liquid oxidizing and similar agents generally known to the art. These oxidizing agents are now used conventionally and I contemplate employing all of these which have advantages and may be employed with and react with hydrocarbons in the absence as well as in the presence of the high energy suspended materials; although the latter in all cases renders the hydrocarbons more reactive. In some cases also the presence of the suspended hydrides, etc., gives a hypergolic action, i.e., by auto ignition in the combustion chamber. In all cases improved results in rocket and rocket engine efficiency are obtained with my composite fuel compared with the same hydrocarbons used alone and the composite fuels are substantially non-settling both in storage and in use because of the substantially equivalent densities or specific gravities of high energy finely divided solids and their respective hydrocarbon fractions in which they are suspended.

The operation of the process of my invention is carried out generally as described above and provides for two separate propellants consisting of a liquid fuel comprising a selected hydrocarbon liquid in which beryllium hydride, or the other hydrides, decarbonane, aluminum hydride, and magnesium borohydride (and also including lithium amide) is suspended in a stable suspension (which is brought about mainly by consideration of the specific gravities of the two phases and in some cases a stabilizing additive and dispersant) and a liquid oxidizer of the type already referred to. These propellants are contained in separate tanks and are mixed only after separate injection into the combustion chamber; and otherwise are not allowed to come into contact with each other. The fuel and oxidizer may be fed separately to the combustion chamber by means of pumps or by gas pressure in the tanks.

RESULTS AND GENERAL EXAMPLES

One of the important standards of measurement in improved efficiency in the use of rocket fuels is the specific impulse, i.e., the thrust in pounds per pound of fuel per second, measured usually in seconds. Specific combinations of fuels and oxidizers give different results which in general are not predictable. For example, on an approximate basis, gasoline with fuming nitric acid shows a specific impulse of about 240 seconds; with 90% hydrogen peroxide it shows about 250 seconds and with liquid oxygen, gasoline shows about 260 seconds, all at the same chamber pressure. With ozone or fluorine as oxidizers the specific impulse of gasoline may exceed 300 seconds. Different fuels also show different results among themselves, not generally predictable because of many variables, for example, gasoline is higher than ethyl alcohol using either hydrogen peroxide or liquid oxygen as an oxidizer; and further while ammonia gives slightly lower results than gasoline using fuming nitric acid as an oxidizer, it is quite superior when liquid fluorine is employed in both cases; although both are high. Hydrazine, a compound (somewhat chemically related to ammonia, but highly toxic) gives a higher specific impulse than any of the foregoing fuels using the same oxidizer. Liquid hydrogen and liquid fluorine give the highest specific impulse of any fuel-oxidizer combination, but are technically most difficult to handle in use since liquid hydrogen boils at $-423°$ F. and liquid fluorine at $-367°$ F., and the latter is both highly toxic and corrosive. Other examples could be cited but it is believed that the foregoing illustrates difficulties at attempts to predict as well as to use these materials.

Many factors influence the specific impulse which while not a basis for prediction give some indications and show a direction, expecially where several factors for a given material cooperate with rather than opposing each other. Among the favorable factors which definitely affect specific impulse are high calorific value (B.t.u.'s per lb.); high combustion chamber temperatures (which do not necessarily follow colorific values); low molecular weights of the original materials and of the combustion products. As examples hydrogen has an extremely high calorific much higher than gasoline (perhaps higher than any other substance) but it shows a relatively low combustion chamber temperature (much lower than gasoline), either with oxygen or fluorine. Apparently the high calorific value together with low molecular weight (the lowest) are sufficient to overcome, in this case, the low chamber temperatures. The importance of the latter is that the hotter the gases the larger the volume occupied or the higher the pressure or both which results in greater thrust through the constant diameter nozzle of the combustion chamber. According to theory combustion chamber temperature is related to the breaking of valence bonds in the fuel and oxidizer during combustion and the formation of more stable bonds in the resulting gaseous products. It is known that in some reactions like the formation of steam from the combustion of hydrogen and oxygen consume energy in the decomposition of the resulting water at a definite temperature, and thus limit the combustion temperature. Low molecular weights of fuel and oxidizer and the resulting combustion products favor high specific impulse because of the large volume to weight relationship of the gaseous products. Whatever the particular explanation may be when two or more factors which strongly favor specific impulse are present at the same time the results as in the case of hydrogen may offset an unfavorable factor and vice versa, but in any event the factors must be determined.

With regard to the above general discussion it is noted and I have observed in connection with the present invention that while some of the high energy finely divided solids may have calorific values of the same order of the hydrocarbons employed by me and of hydrocarbons generally, their combustion temperatures are very much higher than the hydrocarbons by several thousand degrees, and others, e.g., beryllium hydride and magnesium borohydride are much higher in both respects. Moreover all of them have the advantage of low molecular weight and in general are much superior as rocket fuels than hydrocarbons and impart their superior quality to the composite mixture. An important feature of my present invention is the method by which these advantageous factors could be used to overcome certain objectionable properties, and the hazards attending the same, and especially convert the advantages into a physical form which can be practically applied and used as a superior rocket fuel such as has been accomplished by my novel product and process.

Rocket performance characteristics such as payload, range and size and weight of the rocket depend to some extent upon, and in general are related to all of the factors which enter into the specific impulse of which the thrust is an important factor. The latter is maintained uniform in operation, with constant consumption of propellants, i.e., the fuel and oxidizer. As the latter are consumed the total load decreases and acceleration increases. The frame weight, as well as the rocket engine component parts, remains constant and improvements in payload depend not only on increasing the specific impulse as such, but any reduction in initial propellant and dead weight load which will permit substitution of payload will improve performance and efficiency for example reducing the oxidizer requirements.

I have found in connection with my invention that I obtain a very substantial decrease in oxidizer requirements, for which substitution of increased payload may be made; in addition to increased combustion chamber temperatures and an increase in specific impulse resulting in a substantial overall rocket engine and rocket efficiency when I employ my novel composite fuel consisting of a stable suspension of the hydrides mentioned namely beryllium hydride, decarbrane, aluminum hydride, and magnesium boro-hydride as well as lithium amide suspended in a selected hydrocarbon or a mixture of the same as described. Moreover my novel composite rocket fuel is not only more efficient, but is stable and non-settling in storage and use and reduces the overall hazards in handling.

The above findings in connection with my invention demonstrates not only the superiority of the hydrides mentioned above (and lithium amide) as high energy fuel but also disclose a novel composite fuel product and method of preparing the same so as to impart to its superior qualities for handling and use as a rocket fuel, as well as disclosing the manner in which they are employed, i.e., the noved process by which these unique and superior rocket fuels are used to obtain the advantages of their superior properties.

The conditions which may prevail in the combustion chamber of the rocket (without cooling) are temperatures from about 4000° F. to 8000° F. more or less and somewhat higher dependent on the propellant combinations; with pressures of from 300 p.s.i. to 500 p.s.i. more or less and above dependent on several factors. These data are given by way of illustration and are not be limiting in connection with my invention.

SPECIFIC EXAMPLES

A heavy petroleum distillate (of the heavy diesel or burner or boiler fuel type of heavy distillate) in the specific gravity range of 0.85 and 0.9 is mixed with finely divided beryllium hydride (employing the safety precaution of an atmosphere of nitrogen) using about 40% by weight of beryllium hydride and 60% by weight of the heavy petroleum distillate. The beryllium hydride which has a very high specific impulse is first wetted with the petroleum distillate, and the remainder of the distillate added after which the mixture is stirred and agitated. A fluid suspension results which shows practically no tendey to settle on standing (i.e., it may be considered as a stable physical system). No stabilizer is added (or is needed) but could be used under special conditions, e.g., if somewhat lighter or heavier hydrocarbons are used.

The specific impulse of the hydrocarbon fuel component alone with oxygen as an oxidizer is about 250 seconds (pounds of force per pound of fuel per second); that of the above mixture (i.e., the hydrocarbon and beryllium hydride composite fuel) shows about 295 seconds under the same combustion conditions; an increase of about 18%. The oxygen fuel (O/F) ratio for the hydrocarbons alone is about 3.5:1 (using stoichiometric conditions) whereas the beryllium hydride-hydrocarbon fuel composite on a comparable basis would show an oxygen fuel ratio of about 3:1 indicating a saving in oxidizer requirement of about 18%. Since the oxidizer could be as much as 30–50 of the total load weight of the rocket, this saving in oxidizer may be directly reflected in increased payload and range. The advantages shown are outstanding and most important.

Example 1a

The heavy petroleum distillate-beryllium hydride composite fuel as in Example 1a using the other oxidizers mentioned above instead of oxygen, would show corresponding relationships in specific impulses for both the hydrocarbon alone and the composite fuel as in Example 1 dependent upon the oxidizer but in all cases the beryllium-hydride composite fuel shows great increase in specific impulse and decreased oxidizer requirement corresponding as an example to those shown in Example 1a.

Example 1b

In addition to showing further marked improvements in the use of beryllium hydride in connection with my invention as in Example 1 with the use of oxidizers such as ozone and fluorine, it is noted that when the pressures employed are increased, e.g., to the order of 500 p.s.i. to 1000 p.s.i. still further marked improvements are noted even in comparison with Example 1.

Example 2

When using about 50 to 55% by weight of a blend of hydrocarbons consisting of a very heavy petroleum distillate and a coal tar distillate in the range of specific gravities of from about 1.0 to about 1.1 (more or less), and employing about 40 to 45% by weight of very finely divided magnesium borohydride (by suspending the same as described in Example 1), the product shows very good stability with substantially no tendency to settle on standing, i.e., it may be considered a fairly permanent suspension from the practical viewpoint. The following results are noted.

The specific impulse of the heavy hydrocarbon blend alone using oxygen as an oxidizer is about 245 seconds; whereas the mixture of the heavy hydrocarbon blend and the magnesium borohydride shows a specific impulse of about 270 seconds; an increase of about 10%. The oxidizer requirement for the mixture is about 15% less for the composite fuel than for the hydrocarbons which means that a correspondingly heavier payload may be carried corresponding to the reduced oxidizer requirement. A dispersant may be used if necessary to increase fluidity.

Example 2a

When using a straight petroleum distillate such as a very heavy diesel or burner type of from 0.9 to 0.95 and adding thereto about 1% to 2% of aluminum octoate (or similar stabilizer), other conditions being noted as in Example 2; the fuel suspension system was found to be stable and the results otherwise were as noted in Example 2.

Example 3

A heavy petroleum distillate, in the class of heavy diesel oil (to which a very small amount of gasoline is added to improve ignition) from a petroleum crude oil showing predominantly paraffinic characteristics having a specific gravity of about 0.9 is mixed with decaborane employing 40% of the latter by weight and 60% of hydrocarbon oil. The suspension is quite stable and shows substantially no settling for practical use without additive (use of the latter to the extent of about 1% shows no settling over very long periods). The hydrocarbon distillate alone has a specific impulse (with oxygen as oxidizer) of about 240 seconds; and the composite fuel with the decaborane shows about 290 seconds, an increase of about 20%. Oxidizer requirements are found to be reduced about 10%, which reduction in the total load is reflected as shown in Example 1, but in increased payload and/or range. Increases of decaborane in the mixture show corresponding increases in efficiency.

Example 3a

Similar results to those shown in Example 4 may be obtained both in stability of the suspensions and in increased specific impulse as well as in reduced oxidizer requirements when (1) a heavy cycloparaffin sp. gr. 0.89, and hydrogenated napthalenes referred to above sp. gr. 0.895 to 0.97 tetralin and decalin (for stability) especially when the latter are blended to sp. gr. about 0.92 with suitable petroleum distillates. The increase in specific impulse and reduction in oxidizer requirement with consequent increased efficiency are in general of the same value as in Example 4, and in this connection paraffinic petroleum distillates and the hydrogenated napthalenes have additional values to stability in their greater hydrogen content.

Example 4

A very heavy blend of petroleum distillate (heavy diesel or "boiler" fuel), blended with a heavy coal tar distillate (specific gravity and other characteristics of the blend as in Example 2), e.g., sp.gr. about 1.0 to about 1.1 and employing about 50 to 55% of the blended hydrocarbons with 40% to 45% of the stable aluminum hydride (referred to above) gives a composite fuel which is a stable and a non-settling suspension for practical use. The specific impulse increases up to about 275 seconds (the hydrocarbons showed about 240 seconds) an increase of about 15%. The reduction in oxidizer requirement is about 10% to 15%. The overall value of this composite rocket fuel because of high specific impulse however places it in the high energy class.

Example 4a

The use of a very heavy petroleum distillate of about 0.97 sp.gr. with hydrogenated naphthalene, or heavy cycloparaffins making a blend of about 0.95 to 1.0+ using about 2% of aluminum octoate (or other jelling or stabilizing agent) together with a dispersant as found desirable for fluidity requirements the percentages of hydrocarbons and suspended aluminum hydride as shown in Example 4 produces a highly stable suspension from the viewpoint of settling and gives results otherwise approximating those shown in Example 4. Dispersants may be used to increase fluidity if desired.

Example 5

The external oil phase was prepared as shown in Examples 4 and 4a. When no stabilizing or gelling agents were used the heaviest types of both petroleum and coal tar distillates (approximately neutral) were used to conform to the specific gravity of the finely divided lithium amide which was added to form the suspension.

Example 5a

In addition to the above when using either of the types of hydrocarbons employed in Examples 4 and about 2% of a stabilizing agent of the types shown above the suspensions were very stable. When using higher percentage of the finely divided suspended high energy material (and especially with the very heavy hydrocarbons) dispersants were found useful in increasing fluidity. A very marked improvement in useful energy and specific impulse, comparable to some of those used above was noted, with a very substantial reduction in oxidizer requirement which could be reflected in payload and range.

It is obvious from the above that I may use many variables in connection with my invention for example to improve initial ignition, I may add small amounts of gasoline hydrocarbons; as well as varying the relative proportions of the internal and external phases (and the composition of the latter as noted above). Also in the use of gelling and stabilizing agents, dispersants and the like, where found necessary or desirable. In the latter case for example, I may have variations in the difference between the specific gravities of the internal and external phases as much as about 0.2 and greater with good results from the view-point of physical stability.

The foregoing specific examples (as well as the other examples shown herein) of the applications and uses of my invention, are not in any sense to be construed in limiting the same as they are illustrative only and as there are many variations of the same within the broad scope and spirit of my invention.

I claim:

1. A high energy rocket propellant composition which comprises a substantially stable fluid dispersion of a solid high energy compound in finely divided form in the internal phase in a combustible hydrocarbon liquid in the external phase, the said high energy compound being selected from the group consisting of beryllium hydride, aluminum hydride, magnesium borohydride, decaborane, and lithium amide, said composition being further characterized in that the specific gravity of said hydrocarbon liquid in the external phase and that of the said suspended finely divided high energy compound in the internal phase is correlated to prevent substantial separation of the two phases.

2. A high energy rocket propellant composition which comprises a substantially stable fluid suspension of a high energy compound in finely divided form in the internal phase in a combustible hydrocarbon liquid in the external phase, the said high energy compound being selected from the group consisting of beryllium hydride, aluminum hydride, magnesium borohydride, decaborane, and lithium amide, said composition being further characterized in that any difference in specific gravity which may exist between the said hydrocarbon liquid in the external phase and the said suspended high energy compound in the internal phase is less than about 0.1.

3. A high energy rocket propellant composition which comprises a substantially stable fluid suspension of a solid high energy compound in finely divided form in the internal phase in a combustible hydrocarbon liquid in the external phase, the said high energy compound being selected from the group consisting of beryllium hydride, aluminum hydride, magnesium borohydride, decaborane, and lithium amide, said composition being further characterized by the specific gravities of the said hydrocarbon liquid and the said high energy compound being substantially equivalent to each other, to prevent substantial separation of the two phases.

4. A high energy rocket propellant composition which comprises a substantially stable fluid suspension of high energy compound in finely divided form in the internal phase in a combustible hydrocarbon liquid consisting of the intermediate and heavier distillates obtained from petroleum, coal tar and wood tar and other liquid hydrocarbon sources and mixtures of the same in the external phase, the said high energy compound being selected from the group consisting of beryllium hydride, aluminum hydride, magnesium borohydride, decaborane, and lithium amide, said composition being further characterized in that any difference in specific gravity which may exist between the said hydrocarbon liquid in the external phase and the said suspended finely divided high energy compound in the internal phase is less than about 0.1.

5. A high energy rocket propellant composition which comprises a substantially stable fluid suspension of finely divided solid beryllium hydride in a mixture of liquid hydrocarbons selected from the class consisting of the intermediate and heavier distillates from petroleum, coal tar, wood tar and from synthetic and other sources of liquid hydrocarbons, mixtures of the same, the said mixture of liquid hydrocarbons being further characterized by having specific gravities in the range of about 0.8 to about 1.0.

6. A high energy rocket propellant composition which comprises a substantially stable fluid suspension of finely divided solid decaborane in a mixture of liquid hydrocarbons selected from the class consisting of the intermediate and heavier distillates, from petroleum, synthetic paraffinic and cycloparaffinic hydrocarbons and hydrogenated naphthalenes and mixtures of the same, the said liquid hydrocarbons being further characterized by having specific gravities in the range of about 0.8 to about 1.0.

7. A high energy rocket propellant composition which comprises a substantially stable fluid suspension of finely divided solid magnesium borohydride in a mixture of liquid hydrocarbons selected from the class consisting of the heavier distillates, from petroleum, coal tar, wood tar, and from synthetic and from other sources of liquid hydrocarbons, and mixtures of the same, the said liquid hydrocarbons being further characterized by having specific gravities in the range of about 0.9 to about 1.2.

8. A high energy rocket propellant composition which comprises a substantially stable fluid suspension of finely divided solid beryllium hydride in a hydrocarbon liquid selected from the class consisting of the intermediate and heavier distillates from petroleum, coal tar, wood tar and from synthetic and other sources of liquid hydrocarbons and mixtures of the same, the said composition being further characterized by the difference in the specific gravities of the beryllium hydride and the said hydrocarbon liquid being less than about 0.1.

9. A high energy rocket propellant composition which comprises a substantially stable fluid suspension of finely divided solid aluminum hydride in a hydrocarbon liquid selected from the group consisting of the intermediate and heavier distillates from petroleum, coal tar, wood tar and from synthetic and other sources of liquid hydrocarbons, the said composition being further characterized by the difference in the specific gravities of the aluminum hydride and the said hydrocarbon liquid being less than about 0.1.

10. A high energy rocket propellant composition which comprises a substantially stable fluid suspension of finely divided solid magnesium borohydride in a hydrocarbon liquid selected from the group consisting of the intermediate and heavier distillates from petroleum, coal tar, wood tar and from synthetic and other sources of liquid hydrocarbons and mixtures of the same, the said composition being further characterized by the difference in the specific gravities of the magnesium borohydride and the said hydrocarbon liquid being less than about 0.1.

11. A high energy rocket propellant composition which comprises a substantially stable fluid suspension of finely divided solid decaborane in a mixture of liquid hydrocarbons selected from the class consisting of the intermediate and heavier distillates, from petroleum, synthetic paraffinic and cycloparaffinic hydrocarbons and hydrogenated naphthalenes and mixtures of the same, the said liquid hydrocarbons being further characterized by the difference in the specific gravities of the decaborane and the said liquid hydrocarbons being less than about 0.1.

12. A high energy rocket propellant composition as described in claim 1 which in addition contains minor amounts of a stabilizing additive to prevent substantial separation of the two phases.

13. A high energy rocket propellant composition as described in claim 1 which in addition contains minor amounts of a dispersant to increase fluidity.

14. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid high energy compound selected from the group consisting of beryllium hydride, aluminum hydride, magnesium borohydride, decaborane, and lithium amide in finely divided form in a hydrocarbon liquid as the said fuel and the source of said power.

15. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant reactant with said fuel propellant from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid high energy compound consisting of beryllium hydride in finely divided form in a hydrocarbon liquid as the said fuel and the source of said power.

16. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant reactive with said liquid fuel propellant from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid high energy compound consisting of aluminum hydride in finely divided form in a hydrocarbon liquid as the said fuel and the source of said power.

17. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant reactive with said liquid fuel propellant from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid high energy compound consisting of magnesium borohydride in finely divided form in a hydrocarbon liquid as the said fuel and the source of said power.

18. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant reactive with said liquid fuel propellant from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid high energy compound consisting of decaborane in finely divided form in a hydrocarbon liquid as the said fuel and the source of said power.

19. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant reactive with said liquid fuel propellant from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid high energy compound consisting of lithium amide in finely divided form in a hydrocarbon liquid as the said fuel and the source of said power.

20. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant reactive with said liquid fuel propellant from a separate bulk supply to said combustion chamber wherein said fuel and said oxidizer are ignited and undergo combustion and from which the said gases of combustion pass through the said nozzle to produce rocket engine power whereby the rocket is propelled in flight, the imrovement which comprises utilizing a stable suspension of a combustible solid high energy compound selected from the group consisting of beryllium hydride, aluminum hydride, magnesium borohydride, decaborane, and lithium amide in finely divided form in a hydrocarbon liquid and further characterized by a difference in specific gravity between the said hydrocarbon liquid and the said high energy compound of less than about 0.1 as the said fuel and the source of said power.

21. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant reactive with said liquid fuel propellant from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid high energy compound selected from the group consisting of beryllium hydride, aluminum hydride, magnesium borohydride, decaborane, and lithium amide in finely divided form in a hydrocarbon liquid, the said hydrocarbon liquid being further characterized by its specific gravity falling within the range of about 0.8 to about 1.2 as the said fuel and the source of said power.

22. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant selected from the group consisting of liquid oxygen, liquid ozone, white fuming nitric acid, red fuming nitric acid, nitric oxides, hydrogen peroxide, liquid fluorine, chlorine, chlorine monofluoride, chlorine trifluoride, nitrogen fluorides and others from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid high energy compound selected from the group consisting of beryllium hydride, aluminum hydride, magnesium borohydride, decaborane, and lithium amide in finely divided form in a hydrocarbon liquid, the said hydrocarbon liquid being further characterized by its specific gravity falling within the range of about 0.8 to about 1.2 as the said fuel and the source of said power.

23. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant selected from the group consisting of liquid oxygen, liquid ozone, white fuming nitric acid, red fuming nitric acid, nitric oxides, hydrogen peroxide, liquid fluorine, chlorine monofluoride, chlorine trifluoride, nitrogen fluorides and others from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid high energy compound selected from the group consisting of beryllium hydride, aluminum hydride, magnesium borohydride, decaborane, and lithium amide in finely divided form in a hydrocarbon liquid and further characterized by a difference in specific gravity between the said hydrocarbon liquid and the said high energy compound of less than 0.1 as the said fuel and the source of said power.

References Cited

UNITED STATES PATENTS

| | | | |
|---|---|---|---|
| 2,771,739 | 11/1956 | Malina et al. | 60—35.4 |
| 2,890,108 | 6/1959 | Toulmin | 149—87X |
| 2,960,394 | 11/1960 | Schrieber et al. | 149—87X |
| 2,968,917 | 1/1961 | Whaley | 149—87X |

OTHER REFERENCES

Leonard, "Journal of the American Rocket Society," No. 72 December 1947, pp. 10, 11, and 21 (TL, 780. A8).

BENJAMIN R. PADGETT, Primary Examiner

U.S. Cl. X.R.

60—216: 149—87, 22